United States Patent [19]

You et al.

[11] Patent Number: 5,764,602

[45] Date of Patent: Jun. 9, 1998

[54] SEEKING CONTROL METHOD USING TIMER INTERRUPTION FOR ACCELERATING AND DECELERATING THE OPTICAL PICK-UP

[75] Inventors: Won-jae You, Incheon; Do-soo Lee, Suwon, both of Rep. of Korea

[73] Assignee: Samsung Electronics Co., Ltd., Kyungki-do, Rep. of Korea

[21] Appl. No.: 752,224

[22] Filed: Nov. 19, 1996

[30] Foreign Application Priority Data

Dec. 19, 1995 [KR] Rep. of Korea .................. 1995-52232

[51] Int. Cl.$^6$ .................................................. G11B 17/22
[52] U.S. Cl. ........................................ 369/32; 369/33
[58] Field of Search ........................ 369/32, 33, 44.28, 369/44.27, 44.29, 44.34, 44.35, 215

[56] References Cited

U.S. PATENT DOCUMENTS

| 4,866,687 | 9/1989 | Kasai et al. ............. 369/32 |
| 4,955,009 | 9/1990 | Nakatsu et al. .......... 369/32 |
| 5,339,299 | 8/1994 | Kagami et al. .......... 369/32 |
| 5,623,461 | 4/1997 | Sohmuta ................. 369/32 |

*Primary Examiner*—Tan Dinh
*Attorney, Agent, or Firm*—Sughrue, Mion, Zinn, Macpeak & Seas, PLLC

[57] ABSTRACT

A sled motor controlling method for shifting the position of an optical pickup a CD-ROM drive is disclosed. According to the inventive method, the number of tracks from an initial position of a pickup to a target position are counted. A timer interrupt, of a timer inside the CD-ROM, is enabled for acceleration to and rotation at constant speed of a sled motor which moves the pickup. The ennoblement of the timer interrupt is based on a number of reference clock pulses which correspond to the number of tracks to be traversed. A determination is made whether the pickup is approaching the target position. If it is determined that the pickup is approaching the target position, a timer interrupt is enabled for deceleration of the sled motor. Then, all timer interrupts are disabled if it is determined that the pickup has reached the target position. According to the sled motor controlling method in a CD-ROM drive of the present invention, the rotational speed of the sled motor is controlled by using an interrupt or time interval of the timer of a microcomputer in the drive unit. This reduces servo control errors due to mechanical errors. The cost of the drive unit is reduced by eliminating the need for a device for receiving an external reference signal to control the sled motor.

5 Claims, 3 Drawing Sheets

5,764,602

SEEKING CONTROL METHOD USING TIMER INTERRUPTION FOR ACCELERATING AND DECELERATING THE OPTICAL PICK-UP

BACKGROUND OF THE INVENTION

The present invention relates to a sled motor of a compact CD-ROM drive. More particularly, it relates to a sled motor controlling method in a CD-ROM drive which can reduce a servo control error by controlling a sled motor using an interrupt or time interval of a timer in the drive.

A typical optical disk apparatus, such as a CD-ROM drive, controls parameters, such as rotational speed or position, and processing information at a high speed. In such an apparatus, accurate performance can occur when a sled servo and a spindle servo operate in harmony.

FIG. 1 is a schematic diagram of a general CD-ROM drive. Here, the CD-ROM drive includes a spindle motor 12 for rotating a disk 11 seated on a turntable 12t, and a pickup 13 for reproducing information recorded on a disk 11. The pickup 13 is mounted on a pickup driving shaft 14 connected to a sled motor (not shown) for linearly moving the pickup 13 back and forth. Also, the CD-ROM drive includes a microcomputer 16 for controlling the entire driving system, a digital signal processor (DSP) 17 for driving the spindle motor 12 according to a motor driving signal from the microcomputer 16, and a servo signal processor (SSP) 18 for acting as an intermediary between the pickup 13 and the microcomputer 16. The ROM decoder 19 decodes and transmits disk information input (to the DSP 17 from the microcomputer 16) to a host computer 21 via a PC interface 20.

In the above-described CD-ROM drive, the back and forth movement of the pickup 13 and the rotational speed of the spindle motor 12 are controlled by a predetermined external reference signal. According to this method, the microcomputer 16 can control the system accurately with little burden. However, this method requires a device for receiving the external reference signal, which adds to the cost of the drive. Also, mechanical errors are generated due to the use of such a device, which lowers the stability of the system.

SUMMARY OF THE INVENTION

To solve the above problems, it is an object of the present invention to provide a sled motor control method in a CD-ROM drive in which servo control errors are reduced by controlling a sled motor using a timer within the drive without any externally-input reference information.

To accomplish the above object, there is provided a sled motor controlling method in a CD-ROM drive having the steps:

(a) counting the number of tracks from an initial position of a pickup to a target position for the pickup;

(b) determining the number of reference clock pulses based on the number of the counted tracks;

(c) enabling a timer interrupt for acceleration to and rotation at constant speed of a sled motor based on the number of the determined reference clock pulses;

(d) determining whether said pickup is approaching the target position;

(e) enabling a timer interrupt for deceleration if it is determined that said pickup is approaching the target position;

(f) determining whether said pickup has reached the target position; and (g) disabling all timer interrupts if it is determined that said pickup has reached the target position.

According to the present invention, since the sled motor is controlled using the timer interrupt within the CD-ROM drive, servo control errors due to a mechanical error of the drive can be reduced, and an additional device is not needed for receiving external reference signals.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

In the sled motor controlling method according to the present invention, first, a predetermined control program pattern is set with respect to the movement of a pickup over thousands of tracks. Then, the control pattern is stored in a microcomputer or an auxiliary device within a CD-ROM drive. That is, as shown in FIGS. 2 and 3, a predetermined control voltage is set corresponding to the rotational speed of a sled motor (not shown) with respect to time, and the control voltage information is stored in the microcomputer or the auxiliary device within the drive.

Figure 1:
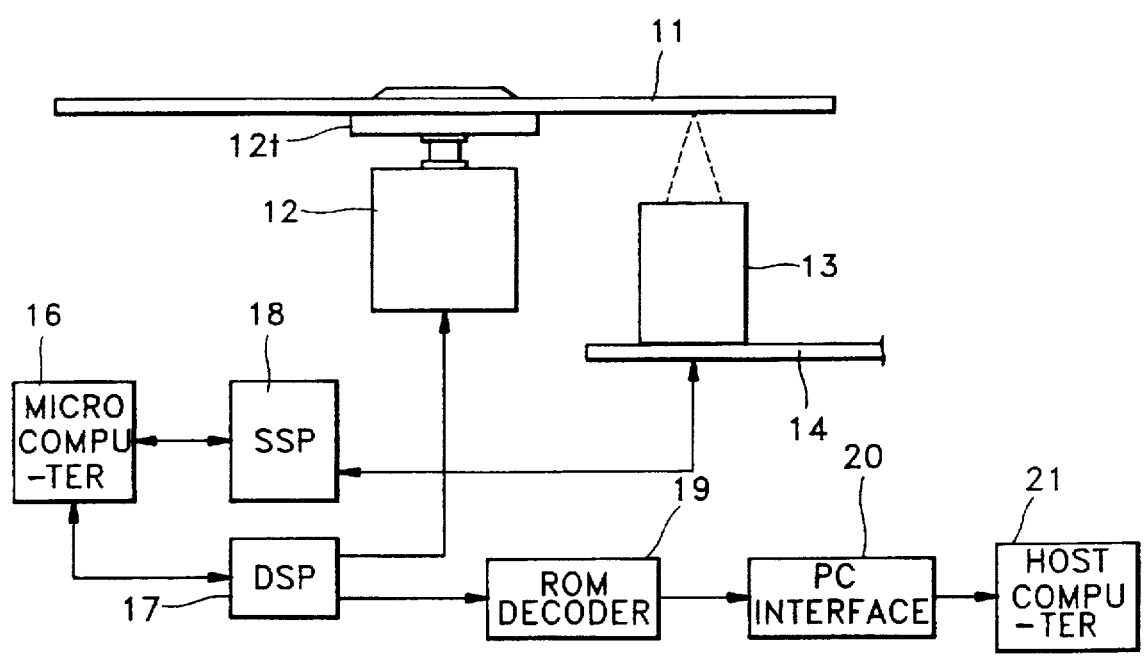
FIG. 1 is a schematic diagram showing an arrangement of a general CD-ROM drive.
Figure 2:
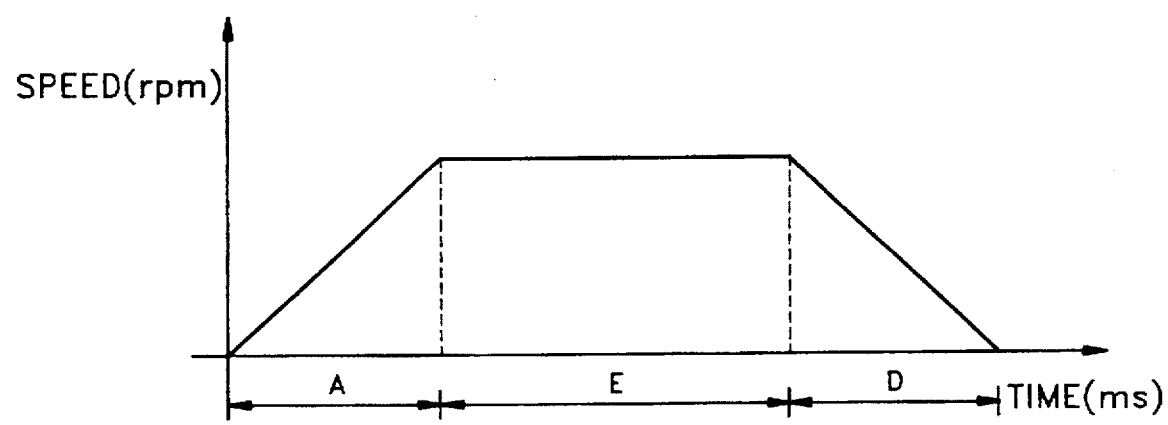
FIG. 2 is a graph showing the rotational speed of a sled motor with respect to time in a sled motor controlling method in a CD-ROM drive according to the present invention.
Figure 3:
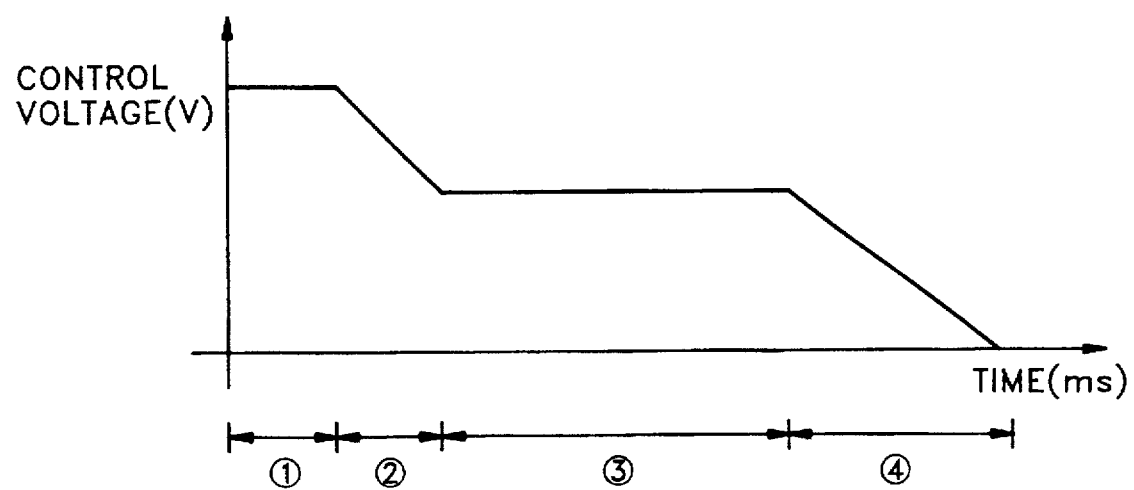
FIG. 3 is a graph showing the control voltage applied to the sled motor corresponding to the graph of FIG. 2 in the sled motor controlling method in the CD-ROM drive according to the present invention.

The sled motor is accelerated to and rotated at a constant speed, and then decelerated from that speed as shown in FIG. 2 by sections A, E and D, respectively, by applying control voltage, shown in FIG. 3, to the sled motor according to commands of the microcomputer 16 (see FIG. 1). The microcomputer 16 regulates the gain of the sled motor control voltage using a method of a pulse-width modulation, thus controlling the rotational speed of the sled motor. According to experiment, sections 1, 2 and 4 of FIG. 3 take 30 ms, 4 ms and 20 ms, respectively, and the duration of section 3 varies according to the desired distance of moving the pickup.

Meanwhile, a timer in the microcomputer is employed to accomplish the above control procedures. This timer frequency-divides system clock pulses by a predetermined number via a register, which causes a count overflow or a carry, thereby generating a timer interrupt. Also, a time interval can be used, instead of the interrupt, to control the rotating speed of the sled motor.

Below, the sled motor controlling method in a CD-ROM drive according to the present invention will be described with reference to the flow chart of FIG. 4.

Figure 4:
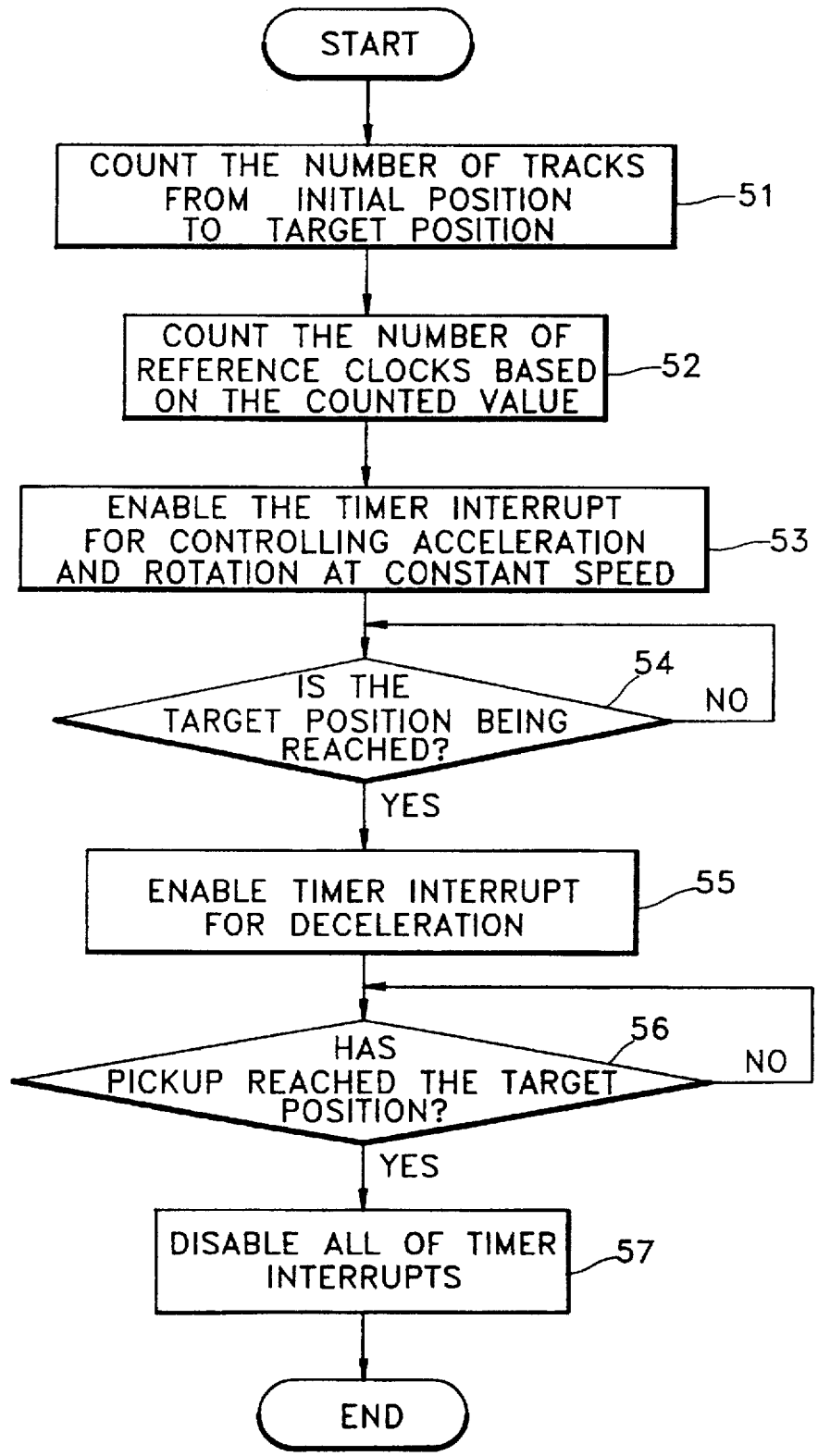
FIG. 4 is a flow chart explaining the sled motor controlling method in the CD-ROM drive according to the present invention.

Referring to FIG. 4, in step 51, the microcomputer 16 counts the number of tracks from an initial position of the pickup 13 (see FIG. 1) to a target position on a disk which the pickup is to be moved to. Thereafter, in step 52, the number of reference clock pulses corresponding to the travel distance of the pickup are determined based on the number of the counted tracks. Then, in step 53, a timer interrupt for acceleration to and rotation at a constant speed of the sled motor is enabled based on the number of the determined reference clock pulses. After that, in step 54, the system checks to see whether the pickup 13 is approaching the desired target position. Here, the system remains in a loop and the sled motor rotates at constant speed until the desired target position is approached. After it is determined that the pickup 13 is sufficiently near the target position, a timer interrupt for decelerating the sled motor is enabled in step 55. Then, in step 56, the system checks to see if the pickup 13 has reached the target position. Here, the system remains in a loop until the pickup 13 has reached the target position. When the pickup 13 has reached the target position, all timer interrupts are disabled in step 57. In this way, the rotational speed of the sled motor is controlled.

As described above, in the sled motor controlling method in a CD-ROM drive according to the present invention, the rotational speed of the sled motor is controlled by using an interrupt or time interval of a timer in the microcomputer within the drive. As a result, servo control errors due to mechanical errors are reduced. Also, the costs for a device for receiving external reference signals can be eliminated.

The present invention has been described with respect to a preferred embodiment. However, it will be appreciated that various changes and modifications may be made to the described embodiment without departing from the spirit and scope of the invention.

What is claimed is:

1. A sled motor controlling method in a CD-ROM drive having a pickup and a sled motor for moving the pickup, said method comprising the steps of:

(a) counting the number of tracks from an initial position of the pickup to a target position for the pickup;

(b) determining a number of reference clock pulses based on the number of the counted tracks;

(c) enabling a first timer interrupt for the operation of the sled motor to accelerate to and rotate at a constant speed, the timer interrupt being based on the determined number of reference clock pulses;

(d) determining whether the pickup is approaching the target position;

(e) enabling a second timer interrupt for operation of the sled motor to decelerate if it is determined in said step (d) that the pickup is approaching the target position;

(f) determining whether the pickup has reached the target position; and (g) disabling all timer interrupts if it is determined in said step (f) that the pickup has reached the target position.

2. The sled motor controlling method in a CD-ROM drive as claimed in claim 1, wherein said first timer interrupt and said second timer interrupt are each enabled for a timer of a microcomputer in said CD-ROM drive.

3. A sled motor controlling method in a CD-ROM drive having a pickup and a sled motor for moving the pickup, said method comprising the steps of:

(a) counting the number of tracks from an initial position of the pickup to a target position for the pickup;

(b) determining a number of reference clock pulses based on the number of the counted tracks;

(c) enabling a first timing interval of a timer for the operation of the sled motor to accelerate to and rotate at a constant speed, the timer interrupt being based on the determined number of reference clock pulses;

(d) determining whether the pickup is approaching the target position;

(e) enabling a second timing interval of a timer for operation of the sled motor to decelerate if it is determined in said step (d) that the pickup is approaching the target position;

(f) determining whether the pickup has reached the target position; and (g) disabling all said timing intervals if it is determined in said step (f) that the pickup has reached the target position.

4. The sled motor controlling method in a CD-ROM drive as claimed in claim 3, wherein said first timing interval and said second timing interval are enabled for the same timer in each of steps (c) and (e), respectively.

5. The sled motor controlling method in a CD-ROM drive as claimed in claim 3, wherein said first timing interval and said second timing interval are enabled for the same timer in each of steps (c) and (e), respectively, said timer being a timer of a microcomputer in said CD-ROM drive.

* * * * *